(12) United States Patent
Bagai

(10) Patent No.: US 6,984,109 B2
(45) Date of Patent: Jan. 10, 2006

(54) ROTOR BLADE PITCH CONTROL ASSEMBLY

(75) Inventor: Ashish Bagai, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 150 days.

(21) Appl. No.: 10/728,270

(22) Filed: Dec. 4, 2003

(65) Prior Publication Data

US 2005/0123400 A1 Jun. 9, 2005

(51) Int. Cl.
*B64C 27/615* (2006.01)
(52) U.S. Cl. ............... 416/1; 416/3; 416/24; 244/75 R; 244/215
(58) Field of Classification Search ............ 416/1, 416/3, 23, 24; 244/75 R, 215
See application file for complete search history.

(56) References Cited

U.S. PATENT DOCUMENTS

| | | | | |
|---|---|---|---|---|
| 2,055,928 A | * | 9/1936 | Hays | 244/215 |
| 2,980,367 A | * | 4/1961 | Johnston et al. | 244/75 R |
| 4,213,587 A | * | 7/1980 | Roeseler et al. | 244/215 |
| 4,715,567 A | * | 12/1987 | Poccard | 244/215 |
| 4,789,305 A | * | 12/1988 | Vaughen | 416/131 |
| 5,409,183 A | | 4/1995 | Gunsallus | |
| 5,626,312 A | * | 5/1997 | Head | 244/75 R |
| 5,639,215 A | * | 6/1997 | Yamakawa et al. | 416/23 |
| 6,530,542 B2 | * | 3/2003 | Toulmay | 416/24 |

FOREIGN PATENT DOCUMENTS

WO    WO 02/094655 A2    11/2002

\* cited by examiner

*Primary Examiner*—Christopher Verdier
(74) *Attorney, Agent, or Firm*—Carlson, Gaskey & Olds

(57) ABSTRACT

A rotor blade assembly provides a pitch control assembly to pitch the rotor blade about a rotor blade pitch axis. The pitch control assembly includes a trailing edge flap and a trailing edge servo flap that extend from the trailing edge of the rotor blade. The trailing edge flap is offset in the span wise direction relative to the trailing edge flap. The trailing edge servo flap is located upon a trailing edge servo flap arm linked to the trailing edge flap. To pitch the rotor blade, the trailing edge servo flap is pitched in a direction opposite the desired pitch direction of the trailing edge flap.

16 Claims, 7 Drawing Sheets

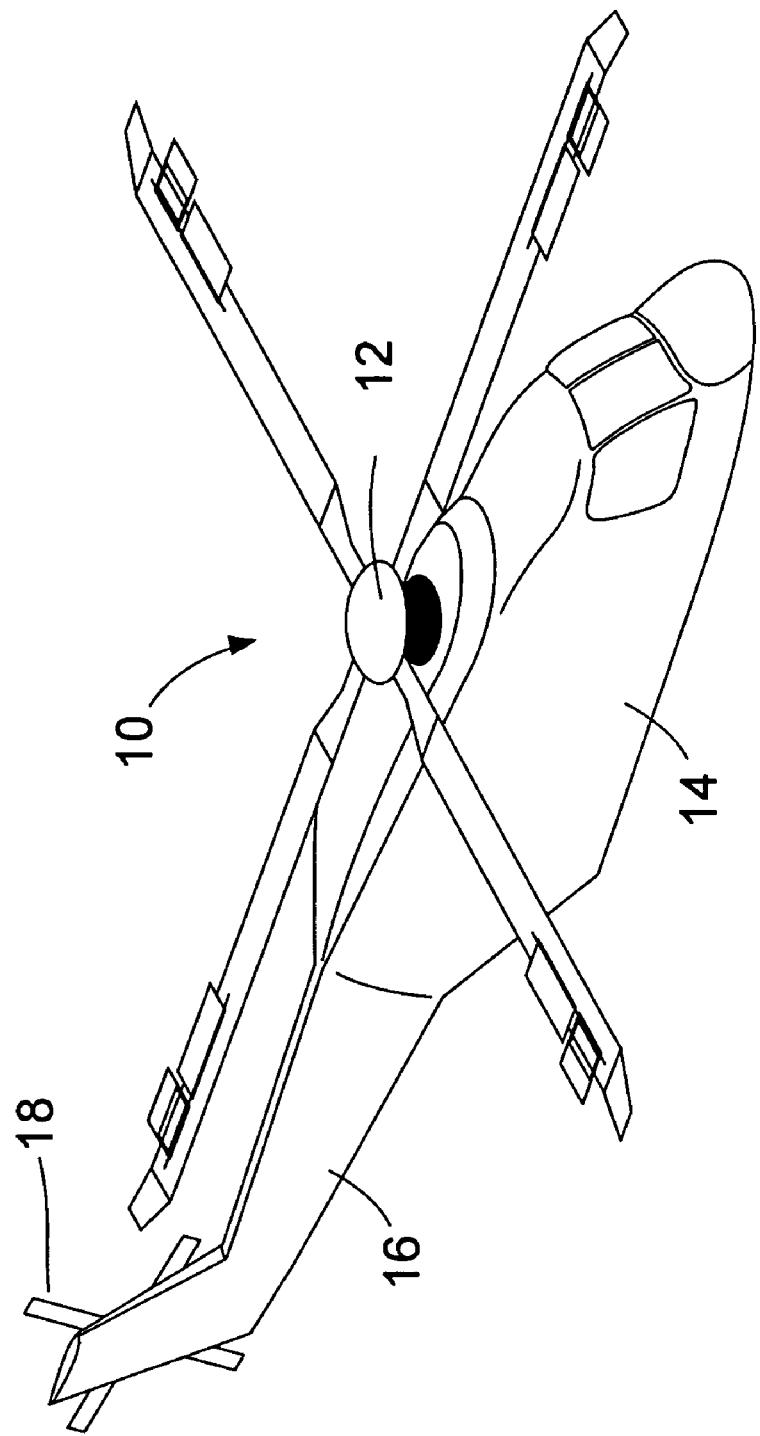

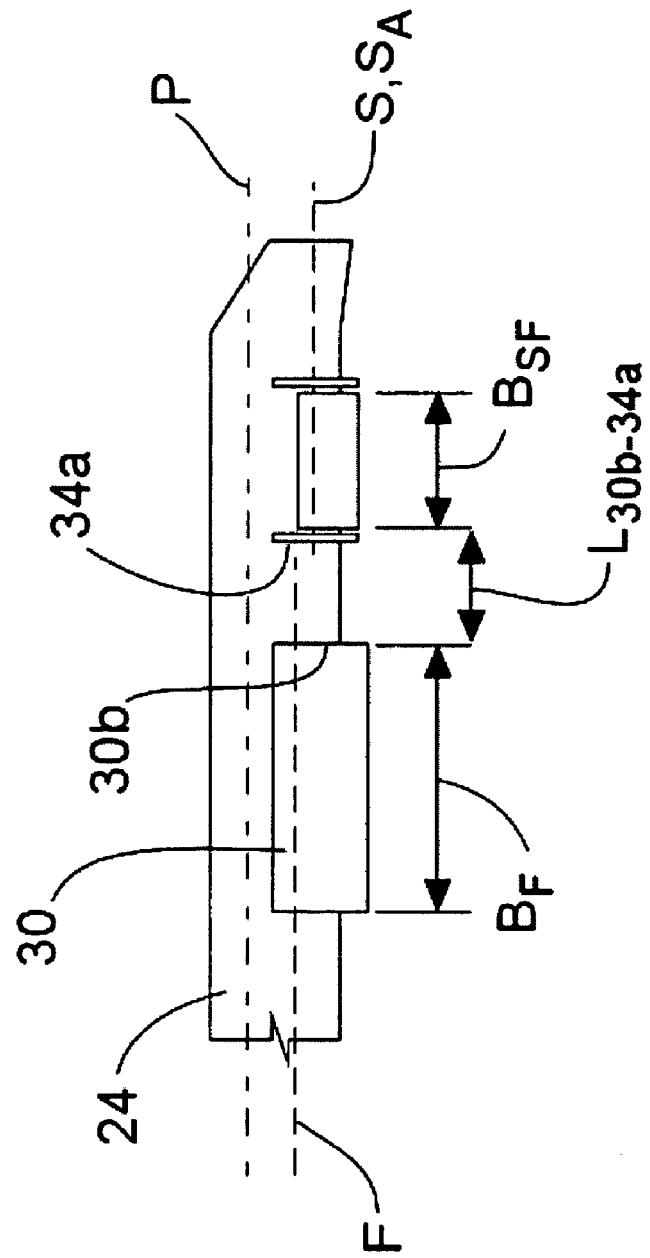

ROTOR BLADE PITCH CONTROL ASSEMBLY

BACKGROUND OF THE INVENTION

The present invention relates to pitch control of a rotor blade assembly, and more particularly to a rotor blade with a trailing edge flap driven by a servo flap that is offset relative to the trailing edge flap along the blade span wise direction.

Some rotary wing aircraft utilize servo flaps for pitch positioning of a main rotor blade. The servo flaps are often located aft of the trailing edges of their associated rotor blades. Such trailing edge servo flaps, in combination with their associated rotor blades, are essentially stable. That is, when the servo flap is moved about its own pitch axis, the blade moves (pitches) toward a balanced condition at which the aerodynamically induced pitch changing moment that is applied to the blade by the servo flap is opposed by the aerodynamic pitch changing moment experienced by the blade.

A major disadvantage of conventional servo flaps is that a relatively large servo flap is usually required to produce the forces and moments necessary to control the pitch of the main rotor blade. These servo flaps require powerful actuators, which may be relatively heavy and mechanically complex. Actuator size may also be a limitation as the actuators must be located within the restricted space inside the rotor blade. Otherwise, significant drag and power penalties accrue if the actuators are exposed to the airflow. Redundancy requirements and the necessity of connecting control armatures and linkages or transferring a motive fluid via hydraulics through a rotational interface to the actuator may further complicate conventional servo flap operation.

Accordingly, it is desirable to provide a rotor blade pitch control system utilizing an uncomplicated and lightweight trailing edge servo flap that requires minimal actuation force and a minimal transfer of a motive force through a rotational interface.

SUMMARY OF THE INVENTION

The rotor blade assembly according to the present invention provides a pitch control assembly to pitch the rotor blade about the rotor blade pitch axis. The pitch control assembly includes a combination of a trailing edge flap and a trailing edge servo flap.

The trailing edge servo flap is located outboard of the trailing edge flap in the span wise direction, relative to the root end of the blade. The servo flap may also be offset from the trailing edge flap in the chord wise direction as measured from the main rotor blade leading edge. The servo flap, if present, is located upon a trailing edge servo flap arm. The servo flap arm is linked to the trailing edge flap and pitches about a trailing edge servo flap arm pitch axis. The chord wise offset the servo flap provides a moment arm to transfer a pitching moment from the servo flap to the trailing edge flap. The span wise offset of the servo flap relative to the trailing edge flap provides a significant increase in aerodynamic force available to pitch the main rotor blade. The cause of this force amplification is a result of locating the servo flap out board of the trailing edge flap in the span wise direction. By so doing, the servo flap operates in a higher speed relative flow environment as induced by the rotational motion of the main rotor blade.

As the aerodynamic forces and moments generated by the servo flap are proportional to the angle of servo flap deflection and proportional to the square of the relative fluid flow, only a small deflection of the servo flap is required in high speed flows compared with larger deflections in low speed flows to produce the same forces and moments. The size and power requirements of the actuators required to drive a servo flap that can extract energy from the relative flow are thereby diminished. A relatively small mechanical or active/smart material (piezio-ceramic or other electromechanical) actuator located adjacent to and/or within the trailing edge servo flap arm, or within the flap or servo flap itself may thus be used to drive the servo flap.

To pitch the rotor blade, the servo flap is pitched in a direction opposite the desired pitch direction of the trailing edge flap. That is, the trailing edge flap is not driven (actuated) directly, but rather, is driven through deflection of the servo flap that, in turn, is linked to the trailing edge flap. The trailing edge flap in turn, transfers moments to the main blade causing the blade to pitch about its own axis.

The mechanical advantage that is realized by offsetting the servo flap from the trailing edge flap in the span wise and/or combined span wise and chord wise directions provides the necessary aerodynamic force amplification required to deflect the trailing edge flap, that in turn results in pitching of the main rotor blade.

The present invention, therefore, provides a rotor blade pitch control system utilizing an uncomplicated and lightweight trailing edge servo flap that requires minimal, if any, transfer of a motive force through a rotational interface. Furthermore, because smart actuators can be made to deflect at frequencies greater than the rotational frequency of the rotor, but can deliver only small forces and deflections compared to larger and heavier actuators, the present invention enables the use of small, light actuators for high frequency rotor blade control. The ability to tune the smart/active control actuators in phase and amplitude to provide deflections at required blade locations also generates favorable blade motions to enhance rotor aerodynamic performance, reduce vibration and reduce noise.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general perspective view an exemplary rotary wing aircraft embodiment for use with the present invention;

FIG. 2b is a variation of the embodiment of the current invention shown in FIG. 2a;

FIG. 2c is a variation of the embodiment of the current invention shown in FIG. 2a and FIG. 2b;

DETAILED DESCRIPTION OF THE PREFERRED EMBODIMENT

Figure 2A:
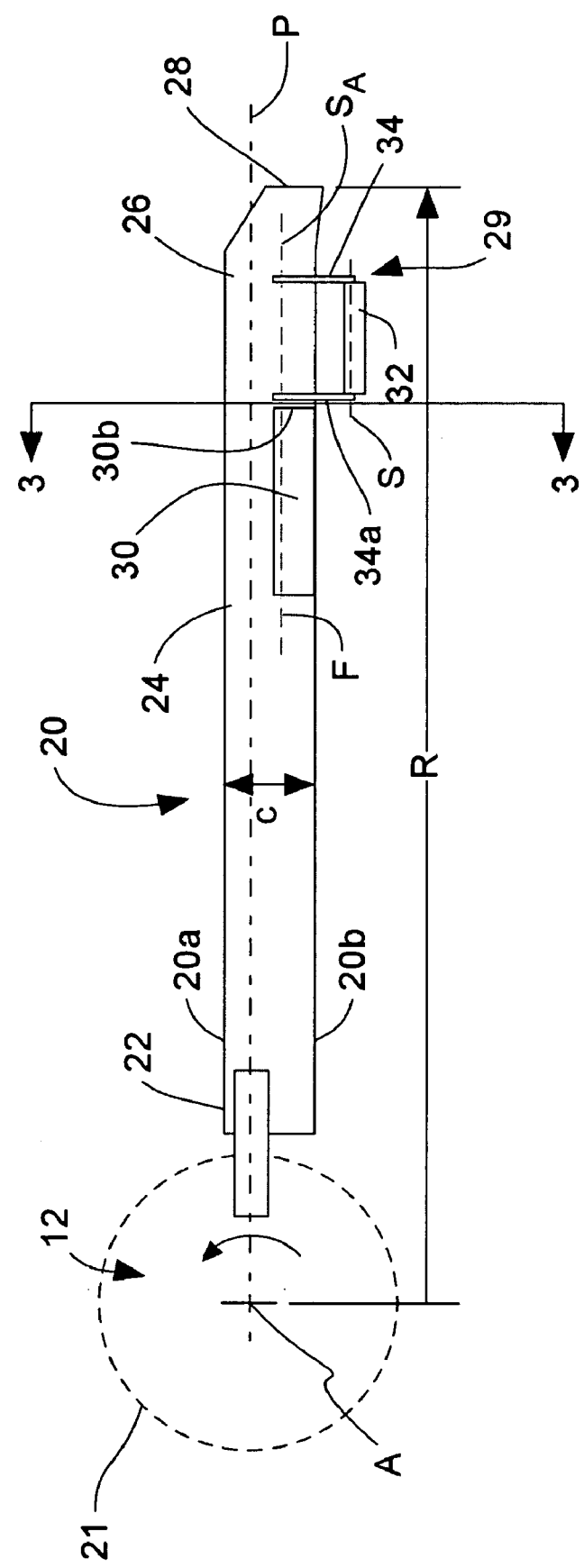
FIG. 2a is a plan view of the embodiment of the current invention on a rotor blade for use with the present invention.

FIG. 1 schematically illustrates a rotary wing aircraft 10 having a main rotor assembly 12. The aircraft 10 includes an airframe 14 having an extending tail 16 which mounts an anti-torque rotor 18. Although a particular helicopter configuration is illustrated in the disclosed embodiment, other configurations such as side-by-side, tilt rotor, coaxial, and tandem designs and configurations will also benefit from the present invention.

Referring to FIG. 2a, a rotor blade assembly 20 (only one illustrated) that is part of a main rotor assembly 12 includes an inboard section 22, an intermediate section 24, and an outboard section 26. The inboard, intermediate, and outboard sections 22, 24, 26 define the span of the main rotor blade assembly 20. The blade sections 22, 24, 26 define a blade radius R between the axis of rotation A and a blade tip 28.

The blade root section 22 is attached to the main rotor assembly 12 for rotating the rotor blade assembly 20 about the axis of rotation A. The rotor blade assembly 20 defines a leading edge 20a and a trailing edge 20b, which are generally, although not necessarily, parallel to each other. A blade pitch axis P is located between the leading edge 20a and the trailing edge 20b. The distance between the leading edge 20a and the trailing edge 20b defines a main element chord length c.

The rotor blade assembly 20 includes a pitch control assembly 29 to pitch the rotor blade about the rotor blade pitch axis P. As the pitch control assembly 29 controls pitch of the rotor blade assembly 20, swashplate-less rotor systems and active flap rotor systems will benefit from the present invention. Moreover, while the pitch control assembly 29 according to the present invention is described herein in terms of the main rotor blades of a helicopter main rotor assembly, one skilled in the art will appreciate that pitch control assembly 29 will have utility for use in combination with other rotating aerodynamic structures such as windmills among others.

The pitch control assembly 29 includes a trailing edge flap 30 and a trailing edge servo flap 32 that extends aft of the trailing edge 20b. The trailing edge servo flap 32 is preferably located outboard of the trailing edge flap 30 relative to the blade axis of rotation A. The trailing edge flap 30 pitches about a trailing edge flap pitch axis f and the trailing edge servo flap 32 pitches about a trailing edge servo flap pitch axis S.

The trailing edge servo flap 32 is preferably mounted upon a trailing edge servo flap aim 34. The trailing edge servo flap arm 34 locates the trailing edge servo flap 32 rearward of the trailing edge 20b in a chord-wise direction. The trailing edge servo flap arm 34 is linked to the trailing edge flap 30 and pitches about a trailing edge servo flap arm pitch axis $S_A$ that is located along the trailing edge flap pitch axis F. That is, axis $S_A$ and axis F are co-joined. Preferably, an inboard trailing edge servo flap arm 34a is rigidly linked either directly or via some mechanical means to an outboard segment 30b of the trailing edge flap 30.

Figure 2B:
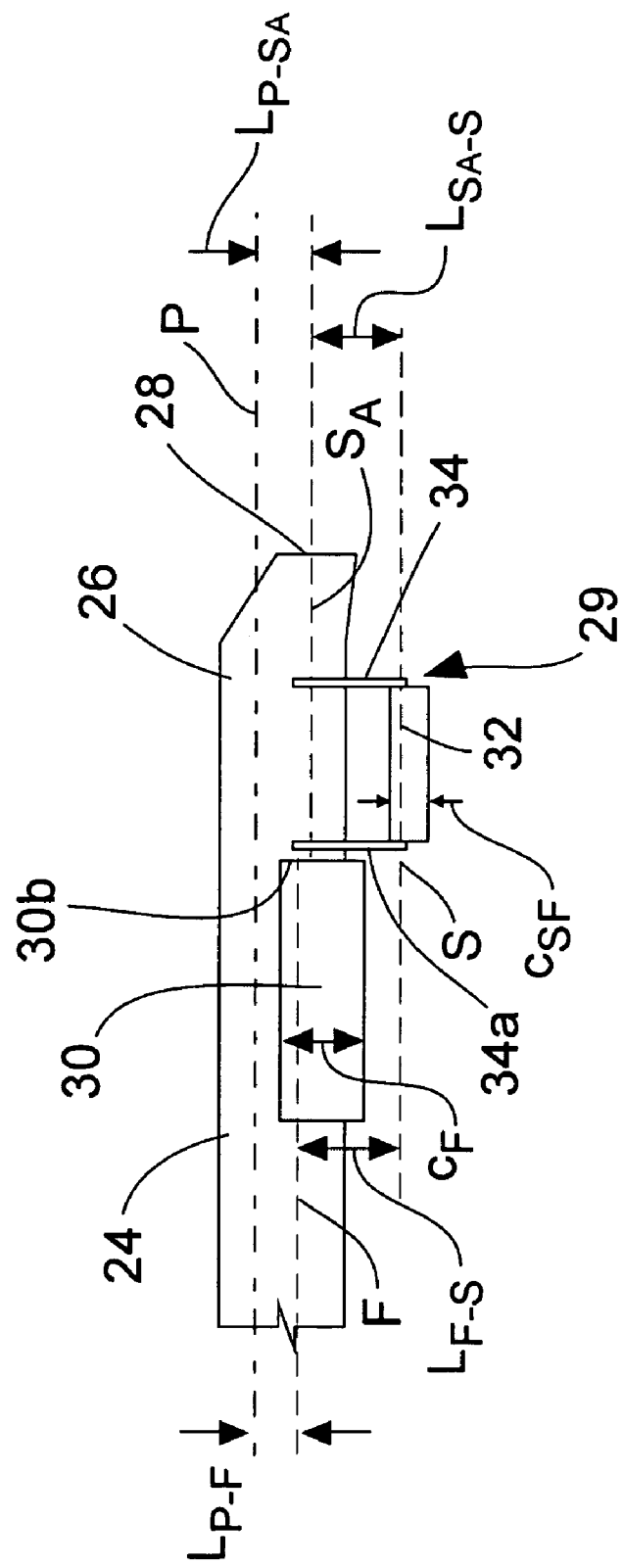

Possible alternative arrangements of the trailing edge flap and trailing edge servo flap are shown in FIG. 2b and FIG. 2c. Only the mid section 24 and the outboard section 26 of the blade are shown for clarity. As depicted in these Figures, several combinations of the positioning of the trailing edge flap 30 and the trailing edge servo flap 32 are possible on the blade. Referring to FIG. 2b, the trailing edge flap axis F is located aft of the blade pitch axis P at a distance $L_{P-F}$. The trailing edge servo flap arm pitch axis $S_A$ is located at a distance $L_{P-SA}$ aft of the blade pitch axis P. It should be understood that $L_{P-F}<L_{P-SA}$ or that $L_{P-F}=L_{P-SA}$ or that $L_{P-F}>L_{P-SA}$. The trailing edge servo flap axis S is located a distance $L_{SA-S}$ aft of the trailing edge servo flap arm axis $S_A$, where S may be located forward, on or aft of $S_A$. The chord of the trailing edge flap 30 is defined as CF and the chord of the trailing edge servo flap is defined as $c_{SF}$. It is possible that $c_F/c<1$ or $c_F/c=1$ or $c_F/c>1$. Alternatively, $c_{SF}/c<1$ or $c_{SF}/c=1$ or $c_{SF}/c>1$. Additionally, $c_{SF}/c_F<1$ or $C_{SF}/c_F=1$ or $c_{SF}/c_F>1$.

Referring to FIG. 2c, the span of the trailing edge flap 30 is defined as $B_F$ and the span of the trailing edge servo flap 32 is defined as $B_{SF}$ and the length ratios are $B_F/R$, $B_{SF}/R$ and $B_{SF}/B_F$. The span wise separation between the trailing edge flap edge 30b and the trailing edge servo flap arm 34a is given by $L_{30b-34a}$. Various combinations of these length ratios are possible.

Figure 3A:
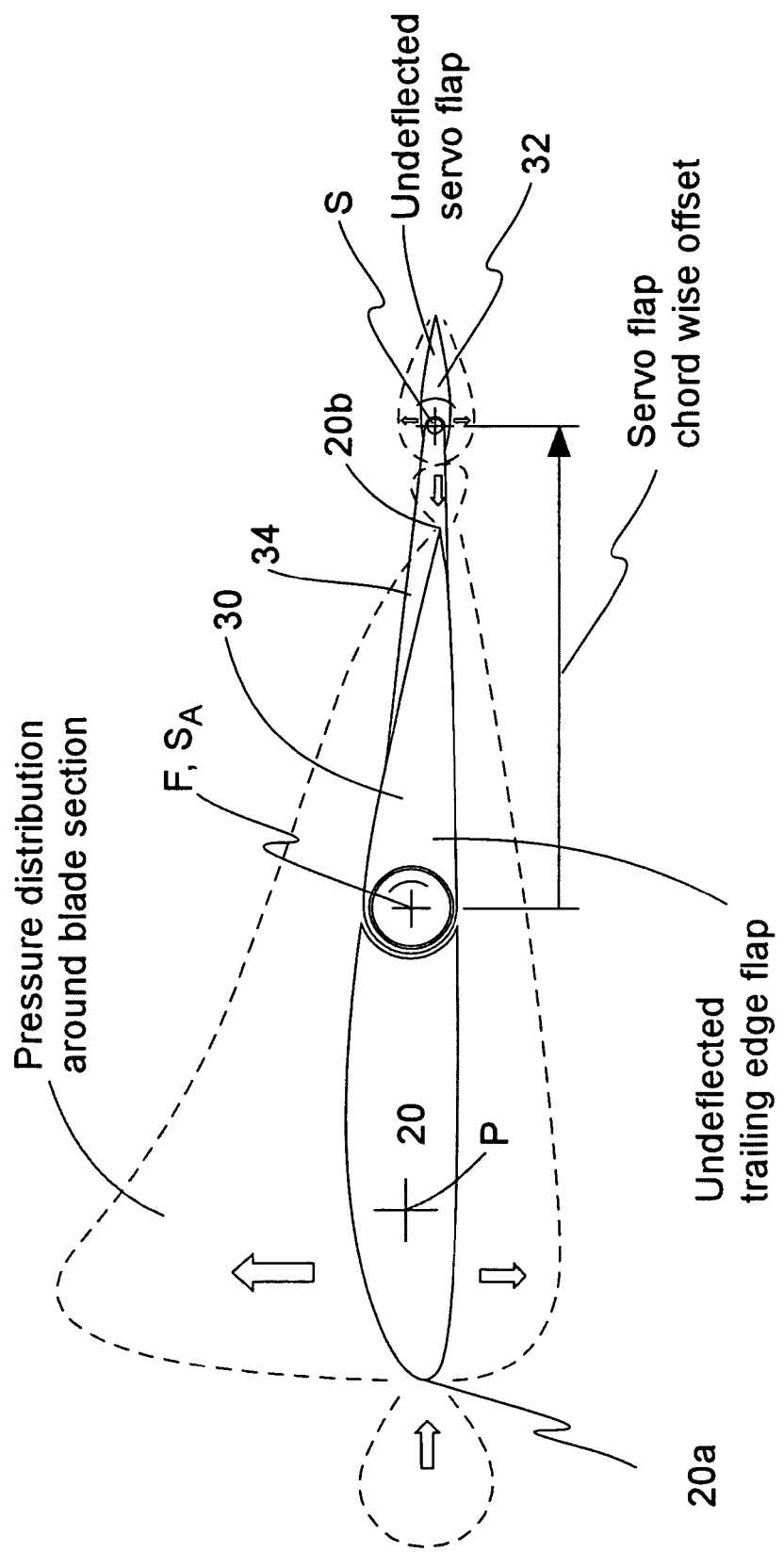
FIG. 3a is a sectional view of the rotor blade taken along line 3—3 in FIG. 2a with the pitch control assembly in a first position.
Figure 3B:
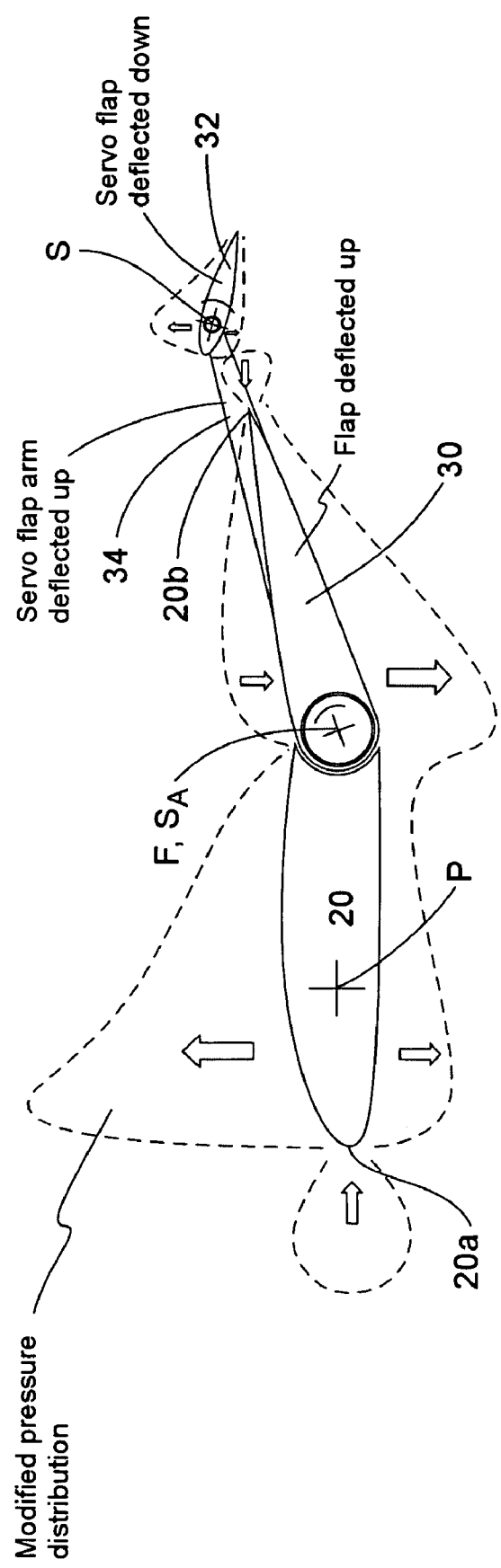
FIG. 3b is a sectional view of the rotor blade taken along line 3—3 in FIG. 2a with the pitch control assembly in a second position.

Referring to FIG. 3a, that depicts the section 3—3 of FIG. 2a, the pitch control assembly 29 is illustrated in a first position. The trailing edge flap 30 and the trailing edge servo flap 32 are generally undeflected and in line with the leading edge 20a and the trailing edge 20b. The pressure distribution is illustrated in phantom around the section of the rotor blade assembly 20, the trailing edge flap 30, and the trailing edge servo flap 32. To pitch the rotor blade 20 to a nose up position, the trailing edge flap 30 must be pitched nose down. To pitch the trailing edge flap 30 nose down, the trailing edge servo flap 32 is pitched nine up (FIG. 3b). Likewise, to pitch the rotor blade assembly 20 to a nose down position, the trailing edge flap 30 must be pitched nose up. To pitch the trailing edge flap 30 nose up, the trailing edge servo flap 32 is pitched nose down. That is, the trailing edge servo flap 32 is pitched in a direction opposite the desired pitch direction of the trailing edge flap 30, but in the same direction as it is desired to pitch the main motor blade assembly 20.

As the trailing edge servo flap 32 is located radially outboard and aft of the trailing edge flap 30, the trailing edge servo flap 32 provides an increased moment arm and an aerodynamic force multiplication to drive deflection of the trailing edge flap 30. That is, the trailing edge flap 30 is not driven directly by an actuator but driven through deflection of the trailing edge servo flap 32 that is linked to the trailing edge flap 30.

Figure 4:
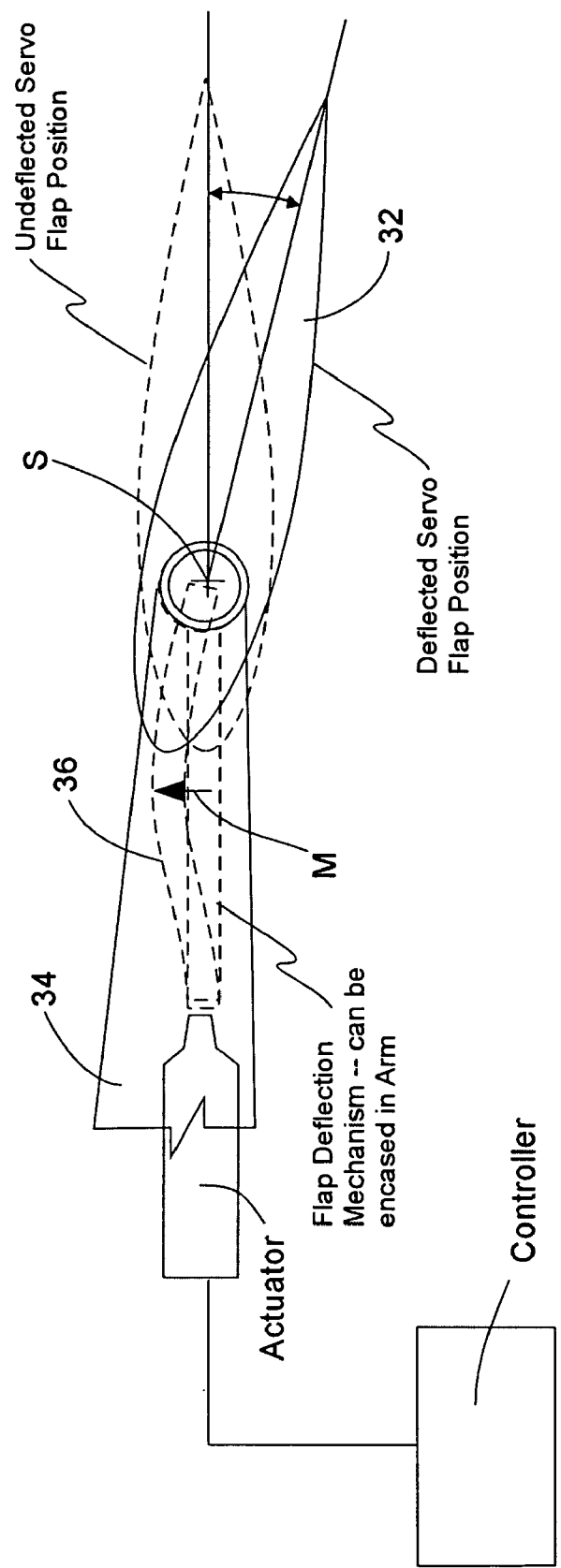
FIG. 4 is an expanded sectional view of a notional pitch control assembly actuator assembly.

Referring to FIG. 4, the trailing edge servo flap 32 is driven by an actuator assembly 36 located adjacent to and/or within the trailing edge servo flap arm 34. The actuator preferably incorporates "smart" materials. As generally known, such actuators provide expansion and contraction in response to an external electro-voltaic field. The "smart" material reacts in a dimensionally predictable, repeatable to the electrical changes and can so be tuned to provide oscillatory deflections of the actuator assembly arm 36 and thus of the servo flap. It should be understood that other actuators will benefit from the present invention.

As the actuator is preferably activated by an electro-voltaic field, the actuator assembly arm 36 is readily located in areas of limited accessibility and activated by electrical power through electrical connections that are relatively lightweight and uncomplicated and can be used to traverse a rotational frame (as represented schematically in FIG. 4). Moreover, by virtue of the relative positioning of the trailing edge servo flap 32 with respect to the trailing edge flap 30, a relatively small force will deflect the servo flap, which deflects the trailing edge flap 30. Such a small force is well within the force generated by an active material or other "smart" material actuators.

The actuator assembly arm 36 is flexed (illustrated schematically by arrow M) in response to the actuator to deflect the trailing edge servo flap 32 in response to a controller or the like. It should be understood that other actuator mechanisms and arrangements for the trailing edge servo flap 32 will also benefit from the present invention. Rapid, precise and accurate positioning of the trailing edge servo flap 32 and the trailing edge flap 30 to position the rotor blade 20 to a desired pitch is thereby readily achieved.

It should be understood that relative positional terms such as "forward," "aft," "upper," "lower," "above," "below," and the like are with reference to the normal operational attitude of the vehicle and should not be considered otherwise limiting. Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor blade assembly comprising:
    a rotor blade defining a blade radius between an axis of rotation and a blade tip;
    a trailing edge flap pivotally mounted to said rotor blade; and
    a trailing edge servo flap linked to said trailing edge flap, said trailing edge servo flap selectively deflectable to deflect said trailing edge flap in response to deflection of said trailing edge servo flap, said trailing edge servo flap deflectable about a tailing edge servo flap pitch axis and said trailing edge flap deflectable about a trailing edge flap pitch axis, said trailing edge servo flap pitch axis displaced chordwise from said trailing edge flap pitch axis; and
    a trailing edge servo flap arm which deflects about a trailing edge servo flap arm pitch axis, said trailing edge servo flap arm pitch axis defined along said trailing edge flap pitch axis.

2. The rotor blade assembly as recited in claim 1, wherein said trailing edge flap positions said rotor blade about a rotor blade pitch axis.

3. The rotor blade assembly as recited in claim 1, wherein said tailing edge servo flap deflects in a first direction to deflect said trailing edge flap in a direction opposite said first direction.

4. The rotor blade assembly as recited in claim 1, further comprising an actuator mounted along said trailing edge servo flap arm to selectively deflect said trailing edge servo flap about said trailing edge servo flap pitch axis.

5. The rotor blade assembly as recited in claim 4, wherein said actuator is mounted within said trailing edge servo flap arm.

6. The rotor blade assembly as recited in claim 4, wherein said actuator comprises a smart material.

7. A rotor blade assembly comprising:
    a rotor blade defining a blade radius between an axis of rotation and a blade tip;
    a trailing edge flap deflectable about a trailing edge flap pitch axis relative to said rotor blade; and
    a trailing edge servo flap located radially outboard of said trailing edge flap and linked thereto, said trailing edge servo flap selectively deflectable about a trailing edge servo flap pitch axis in a first direction to deflect said trailing edge flap about said trailing edge flap pitch axis in a direction opposite said first direction in response to deflection of said tailing edge servo flap.

8. The rotor blade assembly as recited in claim 7, further comprising a trailing edge servo flap arm which deflects about a trailing edge servo flap arm pitch axis, said trailing edge servo flap aim pitch axis defined along said trailing edge flap pitch axis.

9. The rotor blade assembly as recited in claim 8, further comprising an actuator mounted along said trailing edge servo flap arm to selectively deflect said trailing edge servo flap about said trailing edge servo flap pitch axis.

10. The rotor blade assembly as recited in claim 9, wherein said actuator is mounted within said trailing edge servo flap arm.

11. The rotor blade assembly as recited in claim 9, wherein said actuator comprises a smart material.

12. A method of positioning a rotor blade about a rotor blade pitch axis comprising the steps of:
    (1) Linking a trailing edge servo flap with a trailing edge flap, the trailing edge servo flap located radially outboard of the trailing edge flap; and
    (2) Selectively deflecting the trailing edge servo flap about a trailing edge servo flap pitch axis in a first direction to deflect the trailing edge flap about a trailing edge flap pitch axis in a direction opposite the first direction in response to deflection of said tailing edge servo flap.

13. A method as recited in claim 12, wherein step (1) further comprises displacing the trailing edge servo flap chordwise from the trailing edge flap.

14. A method as recited in claim 12, further comprising the step of: locating the trailing edge servo flap upon a trailing edge servo flap arm which deflects about a trailing edge servo flap arm pitch axis, the trailing edge servo flap arm pitch axis defined along the trailing edge flap pitch axis.

15. A method as recited in claim 14, further comprising the step of: linking the trailing edge servo flap arm with the trailing edge servo flap in a fixed relation.

16. A rotor blade assembly comprising:
    a rotor blade defining a blade radius between an axis of rotation and a blade tip;
    a trailing edge flap deflectable about a trailing edge flap pitch axis relative to said rotor blade; and
    a trailing edge servo flap located radially outboard of said railing edge flap and linked thereto, said trailing edge servo flap selectively deflectable about a trailing edge servo flap pitch axis to deflect said trailing edge flap about said trailing edge flap pitch axis in response to deflection of said trailing edge servo flap; and
    a trailing edge servo flap arm which deflects about a trailing edge servo flap arm pitch axis, said trailing edge servo flap arm pitch axis defined along said trailing edge flap pitch axis.

* * * * *

UNITED STATES PATENT AND TRADEMARK OFFICE
CERTIFICATE OF CORRECTION

PATENT NO. : 6,984,109 B2
DATED : January 10, 2006
INVENTOR(S) : Ashish Bagai

It is certified that error appears in the above-identified patent and that said Letters Patent is hereby corrected as shown below:

<u>Column 5,</u>
Line 40, delete "and".
Line 45, delete "tailing" and insert -- trailing --.

<u>Column 6,</u>
Line 57, delete "railing" and insert -- trailing --.

Signed and Sealed this

Sixteenth Day of May, 2006

JON W. DUDAS
*Director of the United States Patent and Trademark Office*